United States Patent Office 3,345,665
Patented Oct. 10, 1967

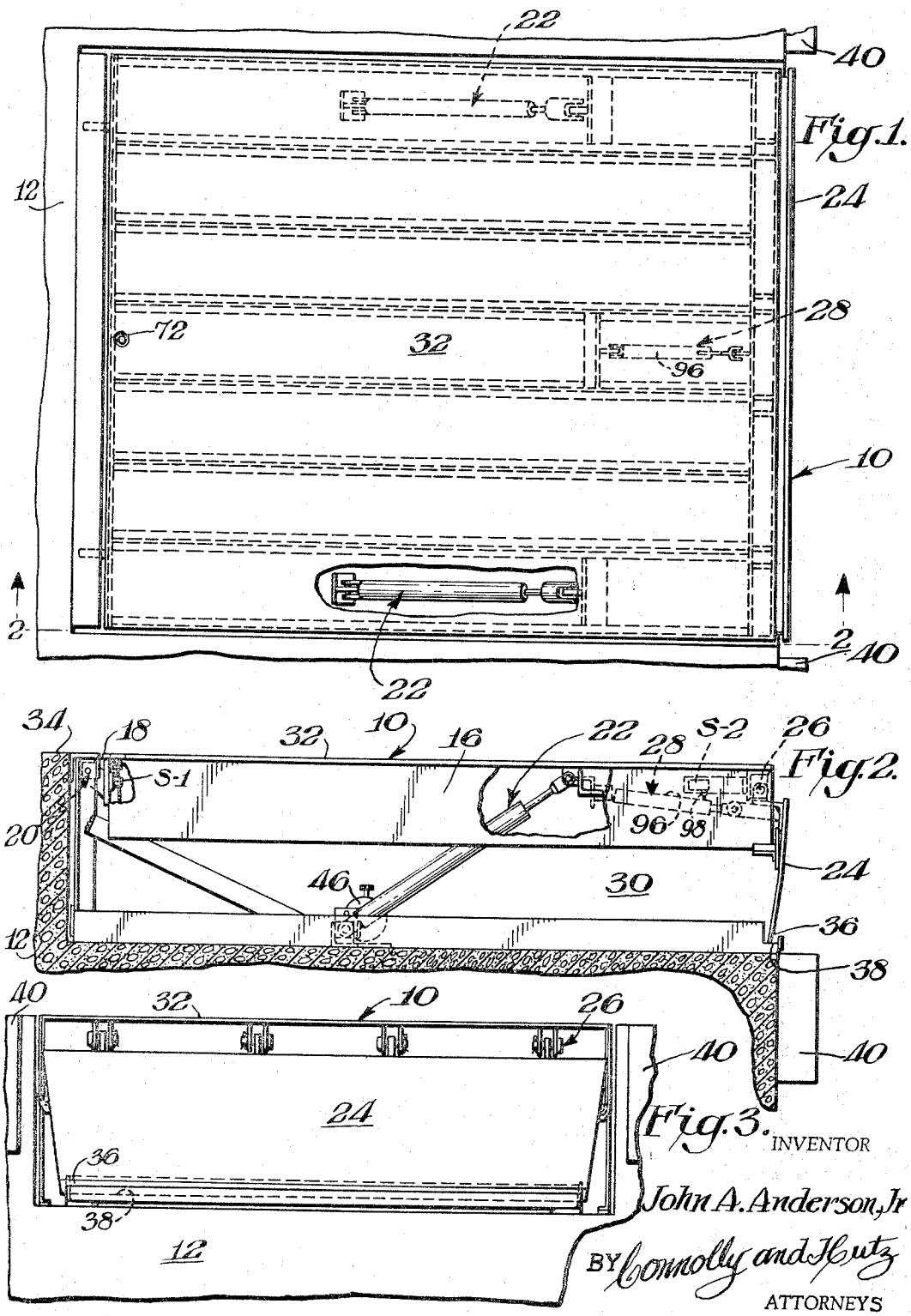

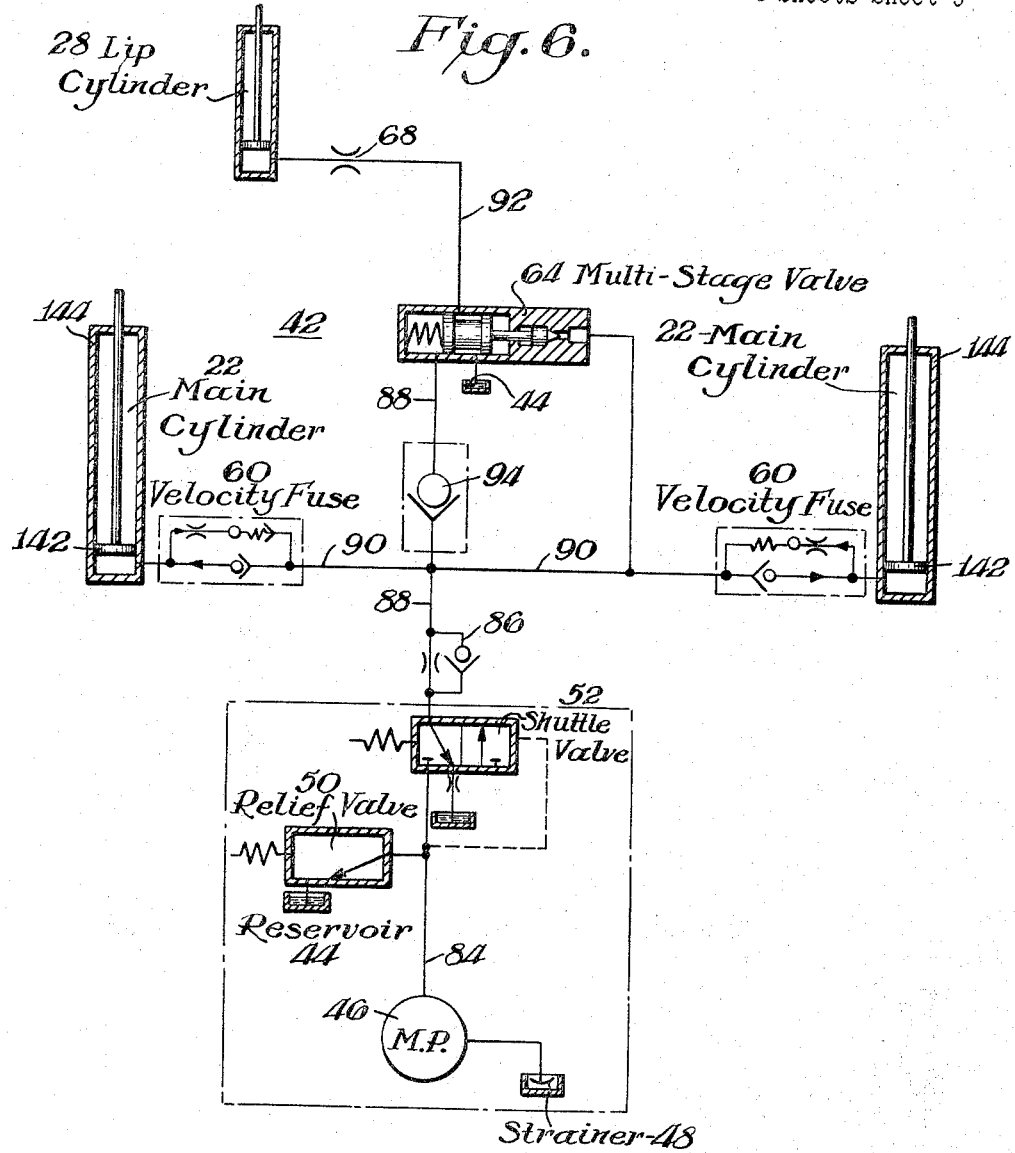

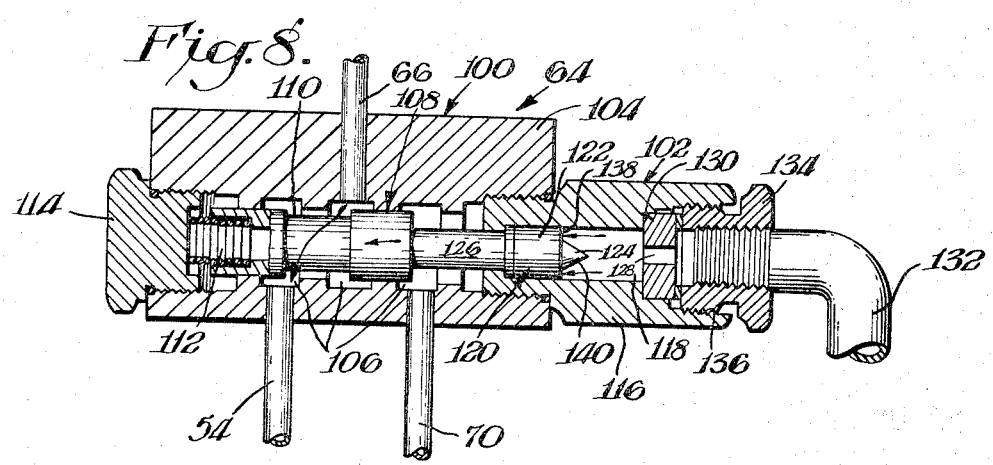

3,345,665
FLUID-OPERATED RAMP HAVING
AUTOMATIC LIP
John A. Anderson, Jr., Fort Wayne, Ind., assignor to
Symington Wayne Corporation, Salisbury, Md., a corporation of Maryland
Filed Sept. 29, 1965, Ser. No. 491,370
11 Claims. (Cl. 14—71)

This invention relates to a fluid-operated ramp for use in conjunction with a loading dock, and it more particularly relates to such a ramp having an automatic fluid-operated lip.

Power operated ramps are used for bridging the space between a loading dock and the bed of a vehicle parked adjacent it. Some of these ramps have a hinged lip that stands in a vertical retracted position while the main platform of the ramp lies horizontally flush with the loading dock to permit traffic along the dock to freely cross over it from side to side. The lip is raised to a bridging position to form a continuation of the ramp when the ramp is elevated over and dropped upon an adjacent vehicle. When the vehicle is driven away from under the lip, the ramp falls and the lip drops to the vertical retracted position.

Copending commonly assigned patent application Ser. No. 411,888, filed Nov. 17, 1964, now Patent No. 3,290,709, describes a fluid-operated type of such a loading ramp in which the lip is fluid-operated in response to changes of pressure in the ramp operating system. The lip-operating system particularly described therein includes a pressure switch and a solenoid valve connected to each other by electrical wiring. It is advantageous to make such a system as simple, economical, rugged and dependable as possible with a minimum of electrical connections.

An object of this invention is therefore to provide a simple, rugged, dependable and economical lip-operating system for a fluid-operated loading ramp.

Another object of this invention is to provide such a system having a minimum of electrical connections.

In accordance with this invention a multi-stage valve controls the application and draining of pressure to and from a fluid-operated lip actuating means. The draining and pressure-applying conditions of the valve are controlled by a movable valve operator having relatively smaller and larger pressure responsive control surfaces. The valve is biased to the draining condition. A gate means confines the pressure in the fluid system to the smaller surface when the valve is in the draining condition and to the larger surface when the valve is in the pressure-applying position.

The valve remains in the draining condition until the platform is raised to its predetermined inclined position against an upper stop thereby raising the pressure in the fluid system to its operating peak. When the platform is below the predetermined inclined position, the pressure in the fluid system is below the operating peak and the biasing force is greater than the force created by the pressure on the smaller surface. This causes the valve to remain in the draining condition.

When the platform is raised to its predetermined upper limit of travel, the peak pressure then reached produces a force on the smaller surface that is greater than the biasing force to move the valve to the pressure-applying condition.

When the raised platform is externally unsupported, the pressure in the fluid system is above a predetermined lower pressure and the biasing force is less than the force of the pressure on the larger surface. This causes the valve to remain in the pressure-applying condition. After the platform becomes externally supported, the pressure in the fluid system drops below the predetermined lower pressure, which produces a force on the larger surface less than the biasing force to automatically cause the valve to move back to the draining condition.

Novel features and advantages of the present invention will become apparent to one skilled in the art from a reading of the following description in conjunction with the accompanying drawings wherein similar reference characters refer to similar parts and in which:

FIG. 1 is a top plan view of a ramp which incorporates an embodiment of this invention;

FIG. 2 is a cross-sectional view in elevation taken through FIG. 1 along the line 2—2;

FIG. 3 is a front view in elevation of the ramp shown in FIGS. 1 and 2;

FIG. 6 is a schematic diagram of the hydraulic system of the ramp shown in FIGS. 1–4;

FIG. 7 is a cross-sectional view in elevation taken through the axial centerline of the multi-stage valve portion of the ramp shown in FIGS. 1–6 in a draining condition; and FIG. 8 is a cross-sectional view in elevation similar to FIG. 7 in the pressure-applying condition.

Figure 4:
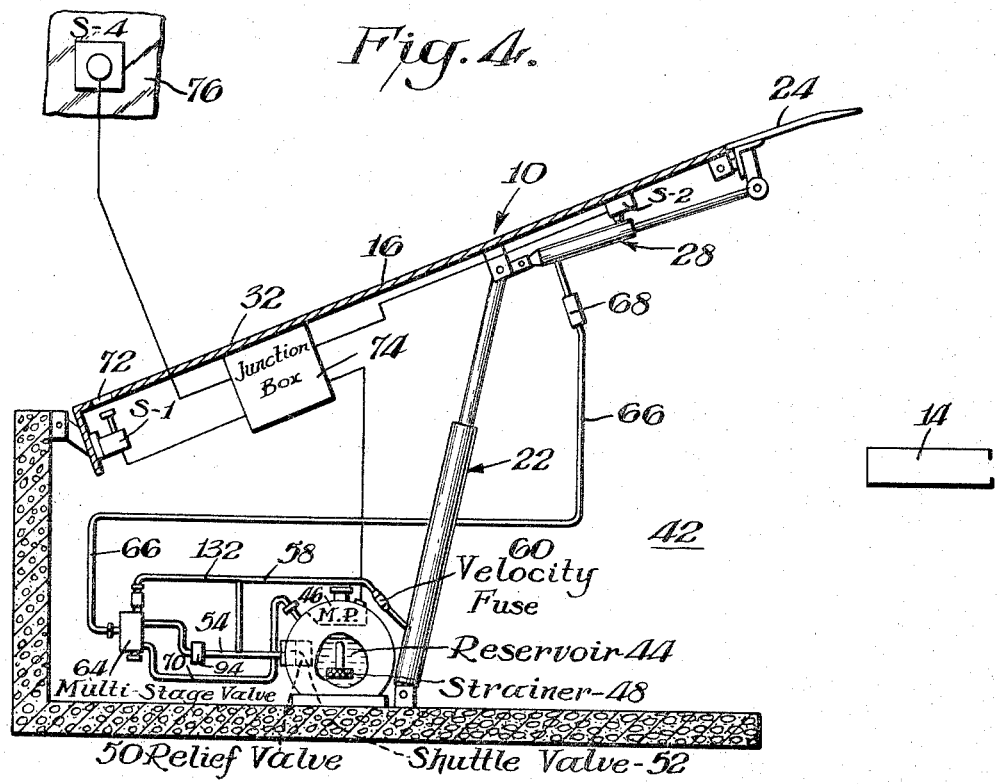
FIG. 4 is a diagrammatic cross-sectional view in elevation of the ramp shown in FIGS. 1–3 in a raised position.

In FIGS. 1–3 is shown a fluid-operated ramp 10 for bridging the space between a loading dock 12 and a vehicle bed 14 shown in FIG. 4 parked adjacent to dock 12. Ramp 10 includes a platform 16 whose rear end 18 is connected to dock 12 by main hinge or coupling means 20. A pair of main operating cylinders 22 react between loading dock 12 and platform 16 to provide fluid-powered elevating means for rotating platform 16 upwardly about main hinge 20. Lip 24 is connected to the front of platform 16 by lip hinge 26 for movement between the substantially vertical retracted position shown in FIG. 2 to a bridging position in which it forms a substantial continuation of platform 16 as shown in FIG. 4. A lip operating cylinder 28 reacts between platform 16 and lip 24 to provide a fluid-powered lip actuating means for raising lip 24 from the vertical retracted to the bridging position.

Ramp 10 is mounted within a rectangular pit 30 in the front of dock 12, and in the crossover position shown in FIGS. 1–3 upper deck 32 of platform 16 lies horizontally flush with the main upper surface 34 of loading dock 12 to permit traffic along the dock to freely cross over platform 16 from side to side. In this crossover condition lip 24 is retracted to a substantially vertical position with its tip 36 resting within crossover slot 38 at the front of pit 30. This causes lip 24 to help support the weight of platform 16 in the crossover position. Bumper blocks 40 are mounted on the front of loading dock 12 on both sides of ramp 10 to prevent an incoming vehicle from bumping into retracted lip 24.

Figure 5:
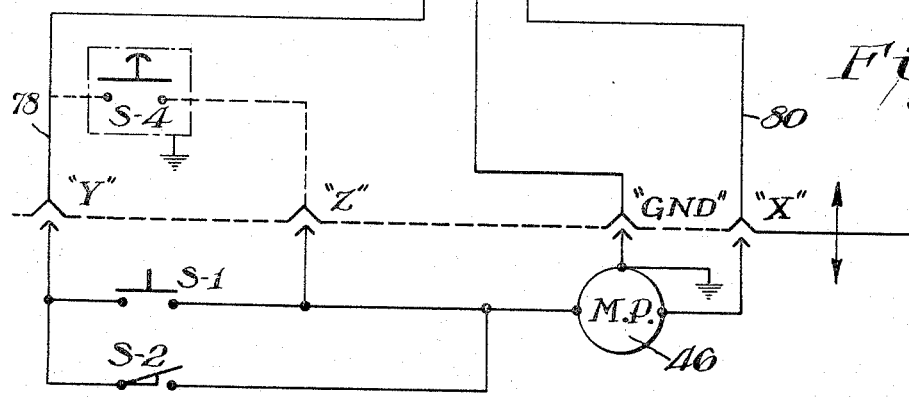
FIG. 5 is a schematic diagram of the electrical system of the ramp shown in FIGS. 1–4.

Diagrams of mechanical, electrical and hydraulic operating aspects of ramp 10 are shown in FIGS. 4–6. FIG. 4 generally describes the physical disposition of operating aspects of ramp 10 and the parts that are operated. As previously described, platform 16 is raised and lowered through hydraulic operating cylinders 22, and lip 24 is raised and lowered through lip actuating hydraulic operating cylinder 28. Hydraulic fluid system 42 (later fully described in conjunction with FIG. 6) includes reservoir 44 within which motorized pump 46 and strainer 48 are conveniently mounted. Pump 46 discharges through shuttle valve 52 to tube 54. Tube 54 is connected to main operating cylinder 22 by tube 58 within which velocity fuse 60 later described is inserted. Tube 54 also connects pump 46 with the supply side of multi-stage valve 64 which is connected by tube 66 to lip operating cylinder 28. Restriction 68 in tube 66 controls the flow of hydraulic fluid to and from cylinder 28. The return side of multi-stage valve 64 is connected through tube 70 to drain back into reservoir 44. Hydraulic system 42 is later fully described in conjunction with FIG. 6.

FIG. 4 shows the physical positions of various electrical components associated with ramp 10, which are also shown connected in circuit in FIG. 5. Switch S–1, reached through hole 72 in deck 32 of platform 16, is connected to junction box 74 for actuating, starting and stopping of motorized pump 46. A remote switch S–4 is similarly connected for actuating the ramp from a remote position, such as upon a wall 76 adjacent loading dock 12. Junction box 74 is mounted under deck 32 of platform 16 and is also connected to motorized pump 46 and lip-operated switch S–2.

FIG. 5 shows the circuit connections of the various electrical components. Main power lines 78 and 80 are connected to opposite sides of single phase 115 volt, 60 cycle power source 82. Motorized pump 46 is connected between lines 78 and 80 through switch S–1, optional wall switch S–4 and lip operating switch S–2. Each switch is connected to energize the pump. Pressurized fluid can then be directed to main operating cylinders 22 to raise platform 16.

FIG. 6 shows the complete hydraulic system 42. The lines of connection are diagrammatic and therefore cannot exactly correlate with the physical tubes shown in FIG. 4. They are therefore differently numbered. Motorized pump 46 is connected through line 84 to shuttle valve 52. Relief valve 50 bypasses to reservoir 44 whenever relief system pressure, for example slightly above 500 p.s.i., is exceeded. Shuttle valve 52 is automatically actuated by pressure in line 84 to close the connection to drain and to pump straight through to the operating system shown above it. It is shown in FIG. 6 in the drain condition. Combination orifice and check valve 86 is connected in line 88 to allow full flow from the pump to the system and only a restricted rate of draining back to reservoir 44. Flexible lines 90 connect the main pressure to main operating cylinders 22 which raise platform 16. Velocity fuses 60 are connected within lines 90 to allow a full flow of pressure to operate cylinder and piston assembly 22 and a restricted flow backwardly to drain through restriction 86 and shuttle valve 52 up to a certain maximum velocity. Velocity fuses 60 are for example of the type described in U.S. Patent 2,821,209, in which the fuses jam shut if the rate of flow back through them exceeds a predetermined maximum rate. This jamming or locking of the fuses is caused if a weight is left on the platform sufficient to cause it to drop at an excessive speed when it is left unsupported. This might happen if a truck should pull out from under the platform when a fork-lift truck remains on the platform. Line 88 is also connected to multi-stage valve 64 through check valve 94. Flexible line 92 connects the valve 64 to lip cylinder 28 which raises lip 24.

Multi-stage valve 64 controls the application and draining of fluid pressure to and from lip cylinder 28. As illustrated in FIGS. 7 and 8, multi-stage valve 64 is composed of valve section 100 and operating section 102 each having draining and pressure-applying positions. Valve section 100 includes cylindrical housing 104 having valve ports 106 connected to tubes 54, 66, and 70 of fluid system 42. As explained above in conjunction with FIG. 4, tube 54 connects motorized pump 46 to valve 64, tube 66 connects valve 64 to lip cylinder 28, and tube 70 connects valve 64 to drain 44. A cylindrical valve spool 108 having a circumferential recessed portion 110 is mounted within housing 104 for movement between draining and pressure-applying positions. Recessed portion 110 connects tubes 66 and 70 to drain pressure from lip cylinder 28 when valve spool 108 is in the draining position shown in FIG. 7. When valve spool 108 is in the pressure-applying position shown in FIG. 8, recessed portion 110 connects tubes 66 and 54 to apply pressure to lip cylinder 28 to raise lip 24. Valve spool 108 is biased to the draining position by coil spring 112 disposed between the spool and threaded plug 114 which serves as a closure for one end portion of housing 104.

Operating section 102 of multi-stage valve 64 includes a cylindrical casing 116 secured by a threaded connection to the other end portion of housing 104. Casing 116 includes cylindrical chamber 118 in which valve operator 120 having cylindrical piston portion 122 and conical nose portion 124 is mounted for movement between draining and pressure-applying positions. Valve spool 108 is connected to operator 120 by linking bar 126 for movement with the operator.

Conical nose portion 124 cooperates with passageway 128 in block 130 to prevent pressure in fluid system 42 from entering chamber 118 when valve operator 120 is in the draining position. A tube 132 connects passageway 128 to tube 90 in fluid system 42 to direct pressure to the passageway. Together, passageway 128 and tube 130 constitute conduit means for connecting chamber 118 to the pressure in fluid system 42. Tube 130 is secured to casing 116 by threaded plug 134 which serves as a closure for open end 136 of casing 116.

Valve operator 120 is also provided with relatively larger pressure responsive control surface 138 and relatively smaller pressure responsive control surface 140 both of which control the movement of the operator. The area of smaller control surface 140 is equal to the cross-sectional area of conical nose portion 124 at the point it contacts block 130. This point is approximately midway between the apex and base of conical nose portion 124. The area of larger control surface 138 is equal to the cross-sectional area of cylindrical piston portion 122.

The force of the pressure in fluid system 42 on pressure responsive surfaces 138 and 140 controls the operation of multi-stage valve 64 as later described in detail. A gate means comprising the peripheral portions of control surfaces 138 and 140 and the interior walls of chamber 118 confines the pressure in fluid system 42 to smaller surface 140 when the valve is in the draining condition and to larger surface 138 when the valve is in the pressure-applying condition.

Lip-operated switch S–2 is shown in FIG. 2 together with lip cylinder 28. The upper surface 96 of cylinder 28 is associated with actuating stem 98 of switch S–2 in a manner that actuates switch S–2 only when lip 24 is displaced from its bridging or vertical retracted position. Accordingly, when pump 46 is inactive and lip 24 is between the bridging and vertical retracted positions, lip-operated switch S–2 energizes pump 46 to actuate the raising of platform 16.

*Operation*

When truck 14 is backed adjacent ramp 10, ramp 10 is raised to engage it with truck 14 by depressing either of pushbutton switches S–1 or S–4. This starts motorized pump 46 and shifts shuttle valve 52 to direct pressurized fluid to main ramp raising cylinders 22. This raises platform 16 to a predetermined upward inclination shown in FIG. 4 above the vehicle bed. When platform 16 is raised to this predetermined upward inclination against a restraining means (provided by the contact of piston 142 against the upper end 144 of cylinders 22 as shown in FIG. 6) the pressure in fluid system 42 rises to a predetermined peak operating pressure which is approximately equal to the pump bypass setting, for example, slightly above 500 p.s.i. At pressures below predetermined peak the biasing force of coil spring 112 on valve spool 108 and valve operator 120 is greater than the force of pressure in fluid system 42 on smaller control surface 140 thereby causing multi-stage valve 64 to remain in the draining condition. When the pressure rises to the predetermined peak, the biasing force of coil spring is less than the force created by the pressure acting on the smaller control surface 140; and valve spool 108 and valve operator 120 move against the biasing force to their pressure-applying positions. In this condition recessed portion 110 connects tubes 54 and 66. This supplies pressure to lip cylinder 28 to raise lip 24 from its vertical retracted to its bridging position. Check valve 94 then maintains lip cylinder 28 pressurized to hold it in the bridging position as long as multi-stage valve 64 remains in the pressure-applying condition. When valve 64 is in the pressure-applying condition, the gate means confines the pressure in fluid system 42 to larger control surface 138. To drop ramp 10 to engage vehicle 14, the actuated one of pump motor operating switches S–1 or S–4 is released to stop the pump. Shuttle valve 52 then shifts to the drain position to cause the platform to drop at a controlled rate of speed governed by restriction 86 in line 88.

Multi-stage valve 64 remains in the pressure-applying condition until lip 24 becomes externally supported upon vehicle 14. As platform 16 lowers, the pressure in fluid system 42 is maintained above a predetermined lower pressure, such as approximately 50 p.s.i., even though platform cylinders 22 are draining to reservoir 44 because of the restriction or orifice 86. When lip 24 becomes supported, the pressure in fluid system 42 drops below the predetermined lower pressure. At pressures above the predetermined lower pressure the force created by the pressure in fluid system 42 upon larger control surface 138 is greater than the biasing force of coil spring 112. Both valve spool 108 and valve operator 120 then remain in the pressure-applying position. The force produced on larger control surface 138 after lip 24 becomes externally supported by vehicle 14 is less than the biasing force of coil spring 112 and valve 64 then moves to the draining condition. In this condition recessed portion 110 connects tubes 66 and 70, and pressure is drained from lip cylinder 28 to condition lip 24 for dropping when vehicle 14 is driven away.

Lip 24 drops from the bridging position when vehicle 14 is driven away and the lip is left unsupported. As explained above lip operating switch S–2 then can energize pump 16 to actuate the raising of platform 16 if lip 24 is too low to drop into crossover slot 38. Platform 16 is raised until lip 24 reaches the vertical retracted position in which switch S–2 deenergizes pump 46 to drop lip 24 into crossover slot 38.

What is claimed is:

1. A fluid-operated ramp for bridging the space between a loading dock and a vehicle bed comprising a platform, coupling means connecting said platform to said loading dock for movement between externally unsupported and supported positions, fluid-operated elevating means connected to react between said platform and said loading dock for raising said platform upwardly about said coupling means to a predetermined inclined position, a lip hinged to the front of said platform, fluid-operated lip actuating means connected to react between said lip and said platform for raising said lip from a vertical retracted position to a bridging position in which it forms a continuation of said platform, a source of fluid pressure, a fluid system connecting said source of fluid pressure to said fluid-operated elevating means and said fluid-operated lip actuating means, restraining means in said elevating means whereby the pressure in said fluid system is raised to a predetermined peak operating pressure when said platform is raised to said predetermined inclined portion, restricting means in said fluid system for maintaining the pressure in said system above a predetermined lower pressure during a period when the platform moves from said unsupported to a supported position, a multi-stage valve means in said fluid system for controlling the application and draining of pressure to and from said fluid-operated lip actuating means, said valve means having a draining condition which causes pressure to be drained from said fluid-operated lip actuating means and a pressure-applying condition which causes pressure to be applied to said fluid-operated lip actuating means, said valve means including a valve section and an operating section each having draining and pressure-applying positions, said operating section having a chamber, conduit means connecting said chamber to said fluid system, a movable valve operator in said chamber having draining and pressure applying positions, biasing means urging said valve means to said draining condition, said valve operator including relatively smaller and larger pressure responsive control surfaces for controlling the movement of said operator, gate means in said chamber confining the fluid pressure in said fluid system to said relatively smaller control surface when said valve means is in said draining condition and to said relatively larger control surface when said valve means is in said pressure-applying condition, the force applied by said biasing means being greater than the opposing force on said smaller surface produced when the pressure in said fluid system is below said predetermined peak whereby said valve means is caused to remain in said draining condition while said platform is below said predetermined inclined position, the force applied by said biasing means being less than the opposing force on said smaller surface produced when the pressure in said fluid system is at said predetermined peak whereby the force on said smaller surface overcomes said biasing means and said valve means is caused to move to said pressure-applying condition when said platform is raised to said predetermined inclined position, the force applied by said biasing means being less than the force on said larger surface produced when the pressure in said fluid system is above said predetermined lower pressure whereby said valve means is caused to remain in said pressure-applying condition for a period while said platform remains externally unsupported, and the force applied by said biasing means being greater than the opposing force produced when the pressure in said fluid system drops below said predetermined lower pressure whereby said valve means is caused to move to said draining position after said platform becomes externally supported.

2. A fluid-operated ramp as set forth in claim 1 wherein said relatively smaller and larger pressure responsive control surfaces have peripheral portions, said chamber has interior walls, and said gate means comprises said peripheral portions and interior walls.

3. A fluid-operated ramp as set forth in claim 2 wherein said chamber is cylindrical and said valve operator includes a cylindrical piston portion and a conical nose portion.

4. A fluid-operated ramp as set forth in claim 3 wherein said relatively smaller pressure responsive control surface comprises the effective cross-sectional area of said conical nose portion between its apex and base where it contacts said interior walls.

5. A fluid-operated ramp as set forth in claim 4 wherein said relatively larger pressure control surface comprises the cross-sectional area of said cylindrical piston portion.

6. A fluid-operated ramp as set forth in claim 1 wherein said biasing means is a spring.

7. A fluid-operated ramp as set forth in claim 1 wherein said valve section includes a cylindrical housing having open end portions and a plurality of valve ports, a cylindrical valve spool having a recessed portion, and said valve spool being connected to said valve operator for movement therewith between draining and pressure-applying positions whereby said recessed portion is caused to connect adjacent valve ports for draining pressure from and applying pressure to said lip actuating means.

8. A fluid-operated ramp as set forth in claim 7 wherein said valve spool is connected at one end to said biasing means and at its other end to said valve operator whereby said valve spool is caused to move with said valve operator.

9. A fluid-operated ramp as set forth in claim 7 wherein a plug is connected to close one end portion of said cylindrical housing, said operating section being connected to the other end portion of said cylindrical housing, and said biasing means reacting between said plug and said valve spool to urge said valve spool to the draining position.

10. A fluid-operated ramp as set forth in claim 9 wherein said relatively smaller and larger pressure responsive control surfaces have peripheral portions, said chamber has interior walls, and said gate means comprises said peripheral portions and interior walls.

11. A fluid-operated ramp as set forth in claim 10 wherein said chamber is cylindrical and said valve operator includes a cylindrical piston portion and a conical nose portion.

References Cited
UNITED STATES PATENTS

| | | | |
|---|---|---|---|
| 3,201,814 | 8/1965 | Le Clear | 14—71 |
| 3,204,270 | 9/1965 | Fenton | 14—71 |
| 3,235,895 | 2/1966 | Wallace | 14—71 |
| 3,255,478 | 6/1966 | Lambert | 14—71 |
| 3,271,801 | 9/1966 | Dieter | 14—71 |
| 3,290,709 | 12/1966 | Whitenack | 14—71 |
| 3,290,710 | 12/1966 | Whitenack | 14—71 |

CHARLES E. O'CONNELL, *Primary Examiner.*

NILE C. BYERS, *Examiner.*